United States Patent
Zeng et al.

(10) Patent No.: US 7,336,809 B2
(45) Date of Patent: Feb. 26, 2008

(54) SEGMENTATION IN MEDICAL IMAGES

(75) Inventors: Xiaolan Zeng, Santa Clara, CA (US);
Wei Zhang, Union City, CA (US);
Alexander C. Schneider, Sunnyvale, CA (US)

(73) Assignee: R2 Technology, Inc., Santa Clara, CA (US)

( * ) Notice: Subject to any disclaimer, the term of this patent is extended or adjusted under 35 U.S.C. 154(b) by 460 days.

(21) Appl. No.: 10/261,196

(22) Filed: Sep. 30, 2002

(65) Prior Publication Data

US 2003/0099385 A1 May 29, 2003

Related U.S. Application Data

(63) Continuation-in-part of application No. 09/993,793, filed on Nov. 23, 2001, now abandoned.

(51) Int. Cl.
*G06K 9/00* (2006.01)
(52) U.S. Cl. ..................... 382/128; 128/922
(58) Field of Classification Search ............. 382/173, 382/174, 175, 176, 177, 178, 179, 180, 130, 382/131, 132, 128; 128/922
See application file for complete search history.

(56) References Cited

U.S. PATENT DOCUMENTS

| | | | | |
|---|---|---|---|---|
| 5,531,227 A | * | 7/1996 | Schneider | 600/425 |
| 5,627,907 A | * | 5/1997 | Gur et al. | 382/132 |
| 5,881,124 A | * | 3/1999 | Giger et al. | 378/8 |
| 5,974,165 A | | 10/1999 | Giger et al. | |
| 5,987,094 A | * | 11/1999 | Clarke et al. | 378/62 |
| 6,185,320 B1 | * | 2/2001 | Bick et al. | 382/132 |
| 6,272,366 B1 | * | 8/2001 | Vining | 600/407 |
| 6,404,936 B1 | * | 6/2002 | Katayama et al. | 382/283 |
| 6,463,167 B1 | | 10/2002 | Feldman et al. | |
| 6,463,181 B2 | * | 10/2002 | Duarte | 382/254 |

* cited by examiner

*Primary Examiner*—Shavesh M. Mehta
*Assistant Examiner*—Anand Bhatnagar
(74) *Attorney, Agent, or Firm*—Morgan, Lewis & Bockius LLP

(57) ABSTRACT

A method and system of volume segmentation is disclosed. To address throughput speed and accuracy requirements, the segmentation is divided into two stages: presegmentation and detailed segmentation. In presegmentation, a digital image volume is processed to identify anatomical structures from image backgrounds in a gross manner possibly at reduced image resolution. Detailed segmentation then involves refining and segmenting further the fine details within the anatomical structures identified by presegmentation. One result of the overall volume segmentation algorithm is a volume in which segmented regions of interest, such as nodules, are identified.

5 Claims, 6 Drawing Sheets

SEGMENTATION IN MEDICAL IMAGES

This application is a continuation-in-part of application Ser. No. 09/993,793, filed Nov. 23, 2001 now abandoned.

CROSS-REFERENCE TO RELATED APPLICATIONS

Related applications are:

"Density Nodule Detection in 3-Dimensional Medical Images," Ser. No. 09/993,792, filed Nov. 23, 2001;

"Method and System for the Display of Regions of Interest in Medical Images," Ser. No. 09/990,508, filed Nov. 21, 2001;

"Vessel Segmentation with Nodule Detection," Ser. No. 09/993,791, filed Nov. 23, 2001;

"Automated Registration of 3-D Medical Scans of Similar Anatomical Structures," Ser. No. 09/993,790, filed Nov. 23, 2001;

"Pleural Nodule Detection from CT Thoracic Images," Ser. No. 09/993,789, filed Nov. 23, 2001;

"Graphical User Interface for Display of Anatomical Information," Ser. No. 09/990,511, filed Nov. 21, 2001, claiming priority from Serial No. 60/252,743, filed Nov. 22, 2000 and claiming priority from Serial No. 60/314,582 filed Aug. 24, 2001;

"Region Growing in Anatomical Images," Ser. No. 10/261,182, filed Sep. 30, 2002;

"Detection and Analysis of Lesions in Contact with a Structural Boundary," Ser. No. 10/261,184, filed Sep. 30, 2002; and "Graphical User Interface for Display of Anatomical Information," Ser. No. 10/261,183, filed Sep. 30, 2002.

This application hereby incorporates by reference the entire disclosure, drawings and claims of each of the above-referenced applications as though fully set forth herein.

FIELD OF THE INVENTION

The present invention relates to segmenting an image into distinctive regions. The invention further relates to methods for efficiently generating accurate segmentation of regions as an aid to medical diagnosis.

BACKGROUND OF THE INVENTION

The diagnostically superior information available from data acquired from various imaging systems, especially that provided by multidetector CT (multiple slices acquired per single rotation of the gantry) where acquisition speed and volumetric resolution provide exquisite diagnostic value, enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital acquisition systems for creating digital images include digital X-ray radiography, computed tomography ("CT") imaging, magnetic resonance imaging ("MRI") and nuclear medicine imaging techniques, such as positron emission tomography ("PET") and single photon emission computed tomography ("SPECT"). Digital images can also be created from analog images by, for example, scanning analog images, such as typical x-ray films, into a digitized form. Further information concerning digital acquisition systems is found in the above-referenced copending application "Graphical User Interface for Display of Anatomical Information".

Digital images are created from an array of numerical values representing a property (such as a radiation intensity or magnetic field strength) associable with an anatomical location referenced by a particular array location. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels.

Once in a digital or digitized format, various analytical approaches can be applied to process digital anatomical images and to detect, identify, display and highlight regions of interest (ROI). For example, digitized images can be processed through various techniques, such as segmentation. Segmentation generally involves separating irrelevant objects (for example, the background from the foreground) or extracting anatomical surfaces, structures, or regions of interest from images for the purposes of anatomical identification, diagnosis, evaluation, and volumetric measurements. Segmentation often involves classifying and processing, on a per-pixel basis, pixels of image data on the basis of one or more characteristics associable with a pixel value. For example, a pixel or voxel may be examined to determine whether it is a local maximum or minimum based on the intensities of adjacent pixels or voxels.

Once anatomical regions and structures are constructed and evaluated by analyzing pixels and/or voxels, subsequent processing and analysis exploiting regional characteristics and features can be applied to relevant areas, thus improving both accuracy and efficiency of the imaging system. For example, the segmentation of an image into distinct anatomical regions and structures provides perspectives on the spatial relationships between such regions. Segmentation also serves as an essential first stage of other tasks such as visualization and registration for temporal and cross-patient comparisons.

Key issues in digital image processing are speed and accuracy. For example, the size of a detectable tumor or nodule, such as a lung nodule, can be smaller than 2 mm in diameter. As a result, an axial section that might be used in detecting such a tumor would typically be a 512×512 array of pixels having a spatial resolution of 500 microns. Moreover, depending on the particular case, a typical volume data set can include several hundred axial sections, making the total amount of data 200 Megabytes or more. In addition, the total data set might include several volume sets, each taken at a different time. Thus, due to the sheer size of such data sets and the desire to identify small artifacts, computational efficiency and accuracy is of high priority to satisfy the throughput requirements of any digital processing method or system.

Thus, it is desirable to provide segmentation systems and methods for segmenting images that are not computationally intensive. It is also desirable that the segmentation systems and methods support various data acquisition systems, such as MRI, CT, PET or SPECT scanning and imaging. It is further desirable to provide segmentation systems and methods that support temporal and cross-patient comparisons and that provide accurate results for diagnosis. It is desirable to provide segmentation systems and methods for registering images that can handle 2-D and 3-D data sets. It is desirable to provide a segmentation approach that can be performed on partial volumes to reduce processing loads and patient radiation doses. It is further desirable to provide a segmentation process that provides results displayable on a computer display or that can be printed to support medical diagnosis and evaluation. The present invention provides a system and method that are accurate, flexible and display high levels of physiological detail over the prior art without specially configured equipment.

SUMMARY OF THE INVENTION

The segmentation algorithm of the present invention is based on the nature of anatomical structures of interest that are present in digital or digitized images. To address the throughput speed and accuracy issues for both display and nodule detection, the segmentation process is divided into two stages: presegmentation and detailed segmentation. In presegmentation, a digital image is processed to identify roughly regions of interest such as the body and the lungs from the image background, possibly at reduced image resolution. Detailed segmentation involves refining and segmenting further the body and other regions identified by presegmentation. One result of the overall volume segmentation algorithm is a volume in which segmented regions of interest are identified. In one application, the regions of interest are nodules, mediastinum and lung field. In another application, they are polyps and the colon.

BRIEF DESCRIPTION OF THE DRAWINGS

Objects, features and advantages of the invention will be more readily apparent from the following detailed description of a preferred embodiment of the invention in which.

DETAILED DESCRIPTION OF THE INVENTION

Figure 3A:
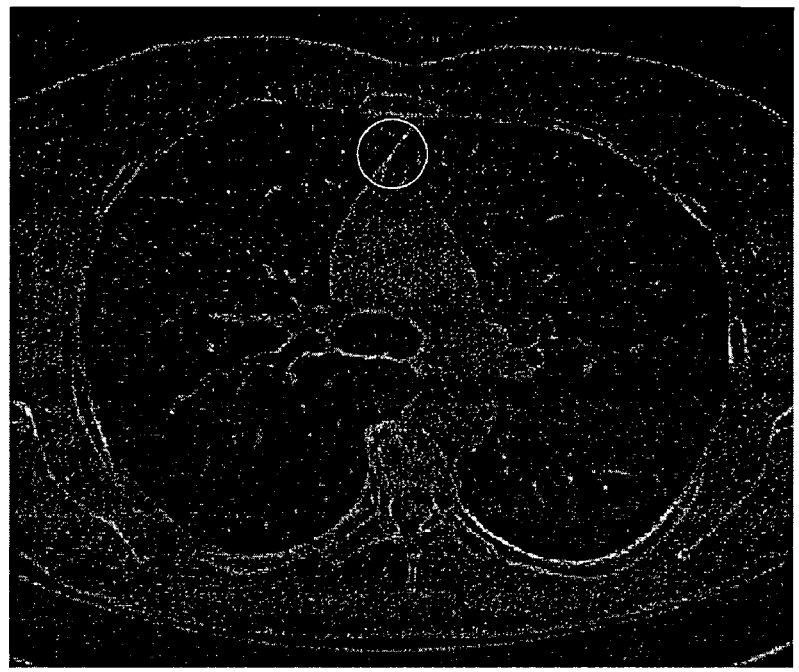
FIGS. 3(a) and 3(b) depict axial image sections with thin anterior and posterior junctions as indicated with circles.
Figure 3B:
Figure 5A:
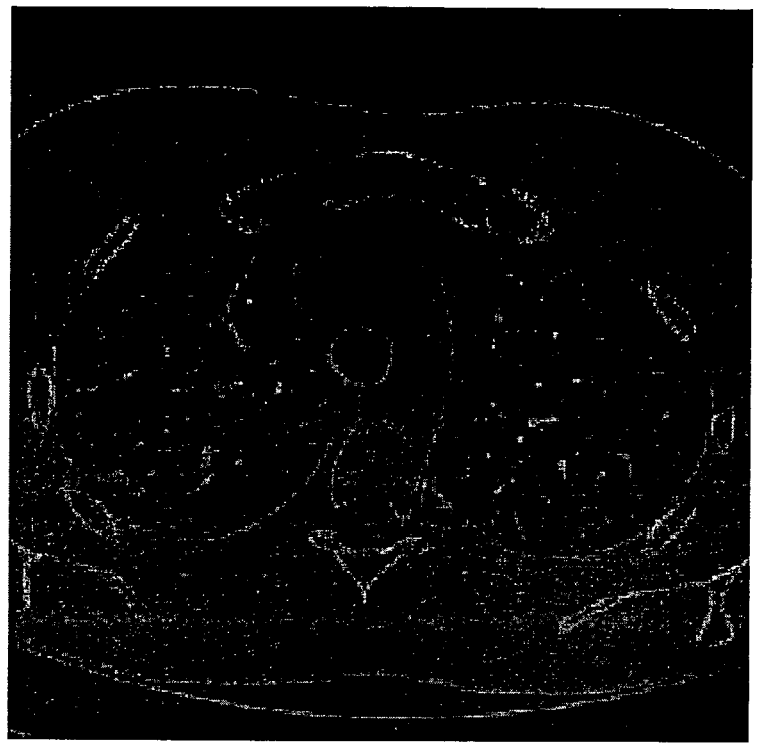
FIGS. 5(a) and 5(b) depict an axial image section and its lung field.
Figure 5B:
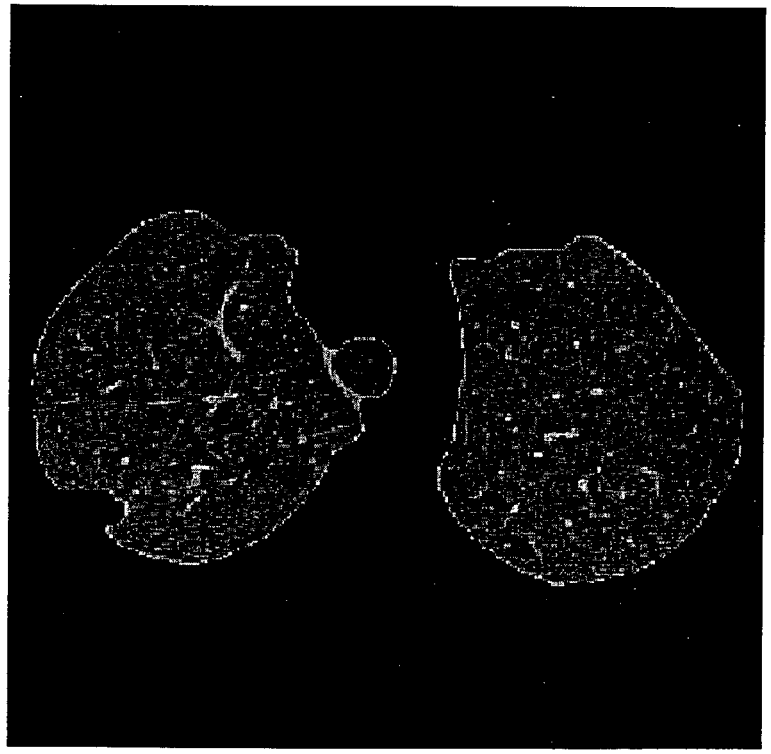

The present invention is preferably performed on a computer system, such as a Pentium™-class personal computer, running computer software that implements the algorithm of the present invention. The computer includes a processor, a memory and various input/output means. In the embodiment, a series of CT axial or other digital images representative of a portion of the body are input to the computer. Illustratively, the portion of the body that is of interest is the thoracic volume; and examples of such digital images or sections are shown in FIGS. 3(a), 3(b) and 5(a). FIG. 5(b) is a segmented lung field corresponding to the CT axial section of FIG. 5(a). The terms "digital" and "digitized" as used herein will refer to images or volumes, as appropriate, in a digital or digitized format acquired via a digital acquisition system or via conversion from an analog image.

The digital image sections to be processed, rendered, displayed or otherwise used includes digitized images acquired through any plane, including, without limitation, saggital, coronal and axial (or horizontal, transverse) planes and including planes at various angles to the saggital, coronal or axial planes. While the disclosure may refer to a particular plane or section, such as an axial section or plane, it is to be understood that any reference to a particular plane is not necessarily intended to be limited to that particular plane, as the invention can apply to any plane or planar orientation acquired by any digital acquisition system.

The software application and algorithm can employ 2-D and 3-D renderings and images of an organ or organ system. For illustrative purposes, a lung system is described. However, the methods and systems disclosed herein can be adapted to other organs or anatomical regions including, without limitation, the heart, brain, spine, colon, liver and kidney systems. While the renderings are simulated, the 2-D and 3-D images are accurate views of the particular organ, such as the lung as disclosed herein.

Figure 1:
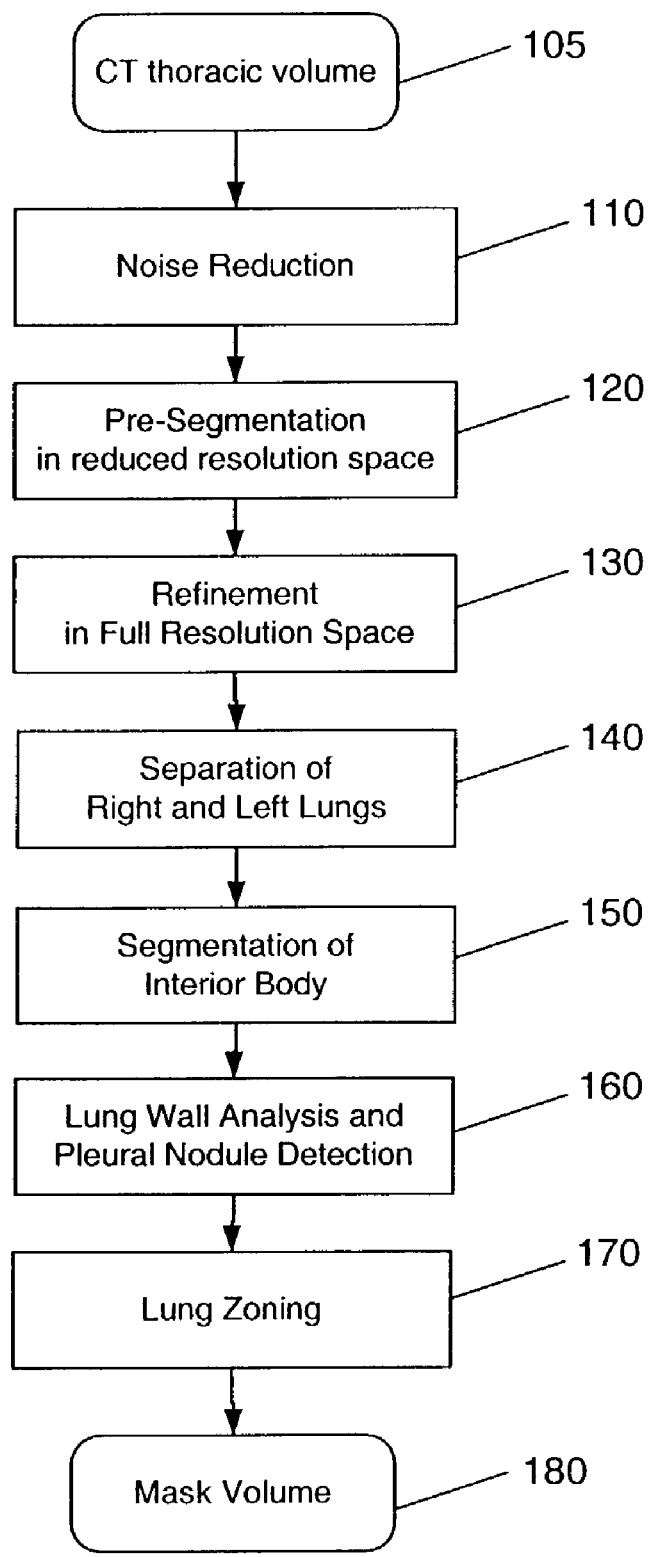
FIG. 1 is a flow chart of a preferred segmentation algorithm of the present invention.

As shown in the illustrative embodiment of FIG. 1, the algorithm operates on a digital image volume 105 that is constructed from stacked slice sections through various construction techniques and methods known in the art. An image, and any resulting image volume, may be subject to noise and interference from several sources including sensor noise, film-grain noise and channel errors. At step 110, optional, but preferable, noise reduction and cleaning is initially performed on the image volume 105. Various statistical filtering techniques can reduce noise effects, including various known linear and non-linear noise cleaning or processing techniques. For example, a noise reduction filter employing a Gaussian smoothing operation can be applied to the whole image volume or partial image volume to reduce the graininess of the image.

Following noise reduction, a presegmentation step 120 is performed to identify certain regions (e.g., background, body and lungs) depicted in the image volume. These regions may be the larger regions in the image such as the background or the body or lungs or they may be specific regions of interest such as the lungs, bones, heart, or colon. To improve computational efficiency, step 120 is performed in a space of reduced resolution. For example, a typical CT axial image is 512×512 array of 12-bit gray scale pixel values. Such an image has a spatial resolution of approximately 500 microns. In the presegmentation step, a resolution of 2000 microns is sufficient. In one approach, adjacent pixels in a digital image are locally averaged, using steps known in the art, to produce an image having a reduced resolution.

As noted, a key to digital volume segmentation is speed in handling throughput requirements and accuracy in finding nodules smaller than 2 mm in diameter. In the presegmentation stage, an image volume is segmented, for example into different anatomical structures and volume fields, at low resolution. These structures and volume fields include various major components of an anatomy, such as the lung(s), bones and heart of the image volume. Because of the lower resolution, presegmentation can be performed quickly as compared to a detailed segmentation performed later at the resolution of the original image volume.

Figure 2A:
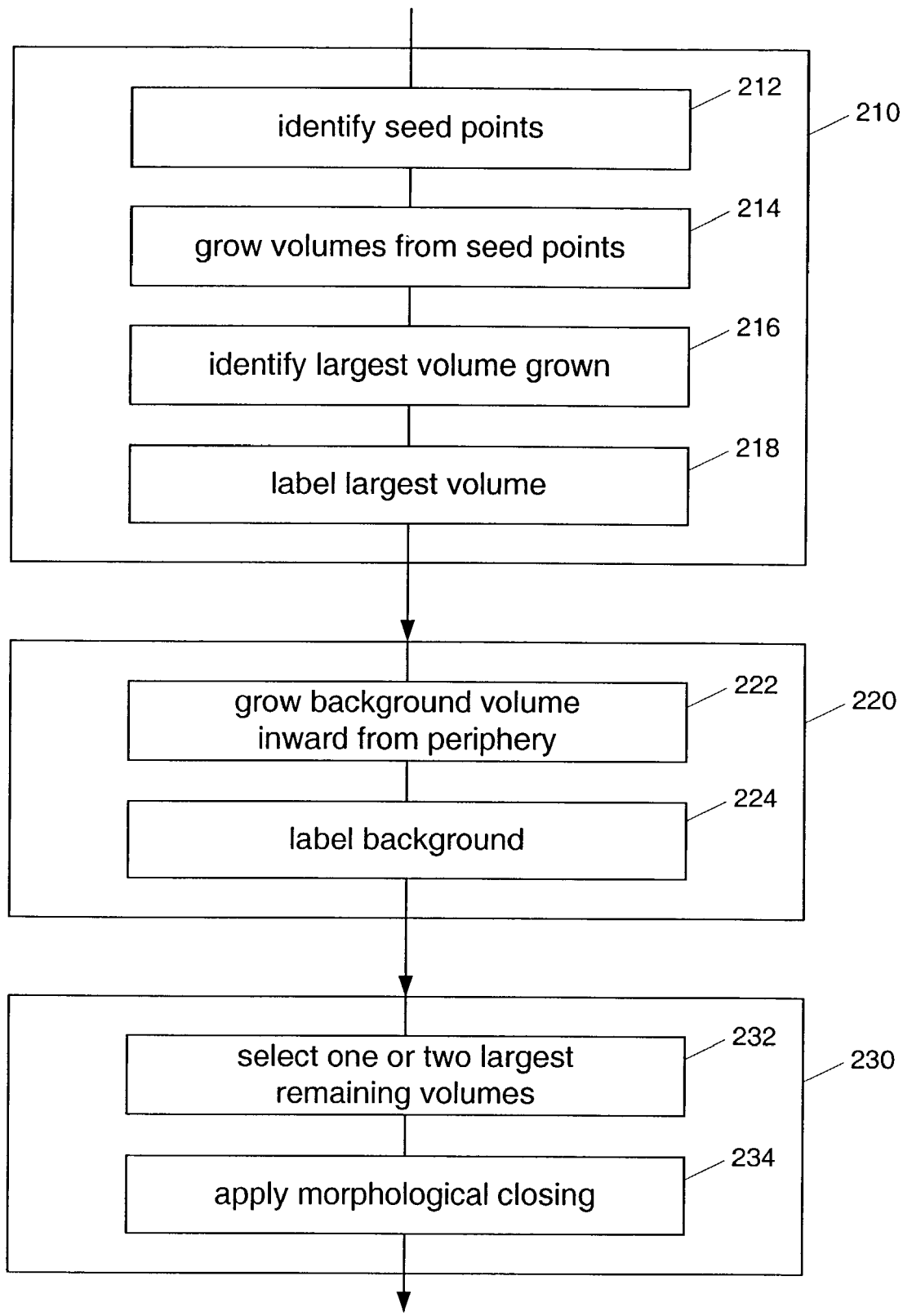
FIG. 2(a) is a flow chart depicting a pre-segmentation of body and lung field.

FIG. 2(a) is a flow chart depicting an illustrative embodiment of the presegmentation step in greater detail. In step 210, a coarse body region is segmented using 3-D region growing as well as size and connectivity analysis. Region growing is a segmentation-like algorithm designed to extract homogeneous regions from an image. Beginning with seed points and continuing with successive stages, merge merits are computed from neighboring pixels, voxels or region fragments, and a choice is made whether to add neighboring pixels, voxels, or fragments to the region being grown. The merits may depend on such properties as homogeneity, edge strength and other image attributes. The process usually stops when no acceptable merges remain to be made. The process can also be stopped artificially when a pre-defined condition is met for specific applications: for example, when the maximal size of the region is reached, or when the region touches certain locations flagged in the image.

Body seed points are identified at step 212. Seed pixels or voxels are chosen to be highly typical of the region of interest or are selected in the body region (including external and internal body regions) as voxels whose gray level intensities exceed a first predetermined threshold. The threshold for seed point selection and the intensity range for region growing are generally chosen according to Hounsfield Unit (HU) values. Volumes are then grown from seed points at step 214 to include regions brighter than a second predetermined threshold that specifies the minimal intensity for the body region. Details concerning region growing are set forth in R. Jain et al., *Machine Vision* (McGraw-Hill 1995) at pages 85–86, 105–108, which are incorporated herein by reference.

Figure 2B:
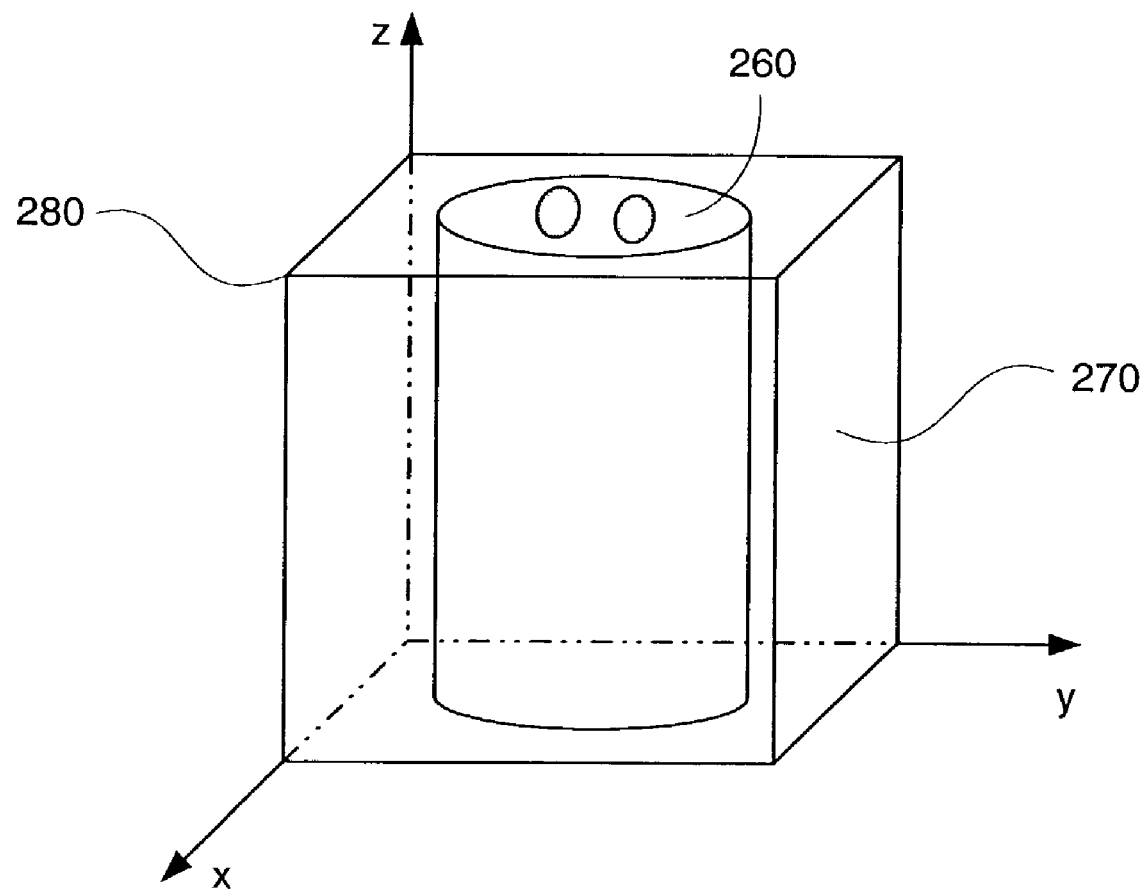
FIG. 2(b) illustrates a sample volume region.

The single largest volume grown is then determined at step 216 and labelled at step 218 as the body. Structures not connected to the body but having similar intensities, such as the arms, are then excluded from the body volume. A sample volume region enclosing a body volume cubic 280 is shown in FIG. 2(*b*). The body volume cubic encloses body volume 260 and is bounded by side planes, such as side plane 270. At this point in the processing, the body volume generally includes an external body region, the mediastinum, the diaphragm and the vessels inside the lungs.

Next, the background is segmented at step 220. From four corner voxels on a digital image section, a background volume is grown inward at step 222 until it reaches the boundary of the volume previously labelled as the body. This step is based on the assumption that the entire lung field is enclosed by the body volume. Regions outside the body volume are labelled at step 224 as background. Described differently, background volume is segmented starting from the four side planes 270 of the body volume cubic 280. The portion of the body volume cubic not enclosed in body volume 260 is considered part of the background.

Voxels that are not labelled either as body or background in the above steps are candidates for lung volume and the lung field is identified at step 230. Size and connectivity analysis are again applied at step 232 to select one or two largest connected volumes as the lung field. This deals with both cases where two lungs either appear to be separated in the image volume, or appear to be connected due to the narrow separation inbetween the two lungs such as separations identified by circles in FIGS. 3(*a*) and (*b*) and sometimes referred to as anterior and posterior junctions depending on their relative location. Three-dimensional feature analysis can be performed to select the lung volume and eliminate other anatomical structures and artifacts. For instance, morphological closing can be applied at step 234 to the captured lung field to fuse narrow breaks and holes within, thus recovering vessels into the lung field and achieving a smoother pleural boundary.

The result from segmentation in low resolution space is then transferred back into the original resolution space so as to identify the larger, segmented regions in the full resolution images. In the case of the illustrative example, the background, body and lung fields are identified in the full resolution image.

Since the background, body and lung fields were segmented at much lower resolution, the borders between these regions will appear jagged in the full resolution image. These edges are smoothed at step 130 in a process called refinement that is performed on the full resolution image. For processing efficiency in lung-based images, such refinement optionally may be limited to the pleural area. In such cases, a narrow band is constructed around the pleural boundary. The width of the narrow band is determined based on the scale of the low resolution space used in step 120. Voxels inside the narrow band are then re-labelled according to their gray level intensities or other attributes, and morphological closing is applied to the refined lung region to form a smooth pleural boundary. For other organs or organ systems, other linings, membranes or outlines may be used for partitioning the background and foreground.

In cases where the anterior/posterior junction tissue separating the two lungs is very thin, the tissue often gets included into the lung field due to certain processing steps described above such as thresholding and morphological operations. For accurate segmentation of right and left lungs, where the lung region on an axial slice forms a single connected piece, the tissue that separates the two lungs is recovered at step 140.

Such a recovery applies to lungs due to known characteristics related to lung anatomy. For the case of lung images, to perform anterior/posterior junction tissue recovery, operation is limited to the central part of the image by excluding the lateral body region. The connectivity from the anterior body region to the posterior body region through the mediastinum is examined. If no such connecting path exists, thin tissue is then grown from the anterior body region until it touches another part of the body region such as the mediastinum or the posterior body region. The grown thin tissue is then excluded from the lung field. If necessary, the same treatment is given to the posterior body region to exclude the thin tissue behind the heart from the lung field. For non-lung images, clearly recovery of anterior/posterior junction tissue would not be necessary. However, anatomical recovery or restoration may be required in a presegmentation step for different organs and systems based on organ or system characteristics where similar recovery considerations would apply.

Figure 4:
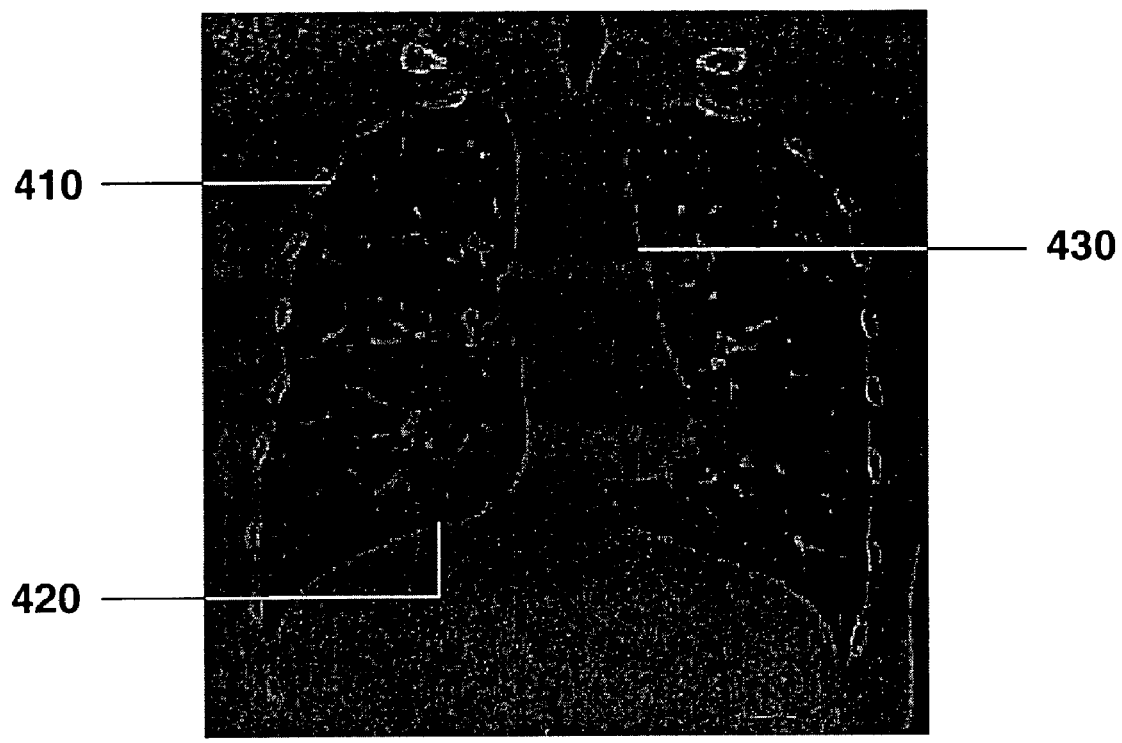
FIG. 4 depicts a reconstructed coronal image section.

Next, the body volume is further segmented at step 150. At this step, specific image border points are identified on the basis of known characteristics of an anatomical region. For lungs, segmentation of the diaphragm 420 and mediastinum 430 is more conveniently done on a reconstructed coronal image section such as that shown in FIG. 4. Costal pleura 410, the portion of the pleura between the lungs and the ribs or sternum, is also shown. The coronal image is formed from the digital images using techniques known in the art. On the coronal image section, costal surface points are first identified as the lateral lung border points. The lower tip of the costal surface border separates the lung base from the costal surface; it is part of the inferior border of the lungs. Two inferior border points are thus located on each coronal image slice for right and left lungs respectively. A straight line connecting the two inferior border points is then drawn. The body region that is above this line and in-between costal surface border is re-labelled as the interior body region. Thus, the interior body region includes the mediastinum and the diaphragm.

The line connecting the two inferior border points is then deformed to fit the convex curve formed by the lung base. The resulting line is referred to as the lung base curve. The interior body region is then further classified as the mediastinum and the diaphragm according to its location (above or below, respectively) relative to the lung base curve.

Similar to the coarse body segmentation described above, region growing and size analyses are used for the segmentation of bone structures at step 155. As in the coarse body segmentation, a thresholding routine determines whether the gray scale intensities of individual pixels or voxels are within a particular region associated with bone structures by testing whether their values are within a range of values defined by one or more thresholds. The threshold for seed point selection and the intensity range for region growing are generally chosen according to Hounsfield Unit (HU) values of maximal and minimal bone densities or tissue regions. In volume or region growing techniques, and as further described with respect to steps 210 and 212, a seed voxel element is first identified within the anatomical structure of interest. Nearby voxels are "grown" to the seed voxel if such voxels are identified as belonging to the same structure of the seed voxel and the adjacent voxels meet a specified physical attribute, generally based on thresholding, texture analysis or other attribute-based analysis. For the lung region, the single largest connected piece of such grown region including the ribcage is labeled as bone. Grown regions within the interior body are labeled as body calcifications (including cardiac calcifications).

In the above processing, large pleural nodules that show as promiment protrusions from the pleura are often lost due to their similarity in intensity to body volume. To ensure that such pleural nodules are included in the lung field, the pleura smoothness is analyzed at step 160. A deformable surface model is used to obtain regularized pleural surfaces, from which the pleural nodules can be detected and recovered. More details on lung wall analysis and pleural nodule detection can be found in the above-referenced applications "Pleural Nodule Detection from CT Thoracic Images," Ser. No. 09/993,789, and "Density Nodule Detection in 3-Dimensional Medical Images," Ser. No. 09/993,792, both having been incorporated by reference.

Next, the organ or organ system is further segmented or zoned based on known characteristics of the organ. To fully utilize knowledge of lung anatomy and to facilitate effective nodule detection, the lung field is segmented at step 170 into lobes and special zones. For example, the costal peripheral zone can be easily identified as regions within a certain distance from costal surface points that lie on the border of the external body and lung field. The result of segmentation is passed onto subsequent processing 180 in the form of a mask volume, in which pixels that belong to each distinctive anatomical region or structure of interest are assigned different labels.

By segmenting the lung field into several distinctive anatomical regions, it becomes possible to apply different techniques for the detection and analysis of lesions in the different anatomical regions. For example, different techniques are available for the detection of plural nodules and for nodules attached to the blood vessels of the lungs as described in the above referenced application Ser. No. 09/993,789 and Ser. No. 09/993,791, respectively. Similarly, different techniques are available or can be expected to be available for the detection of different types of lesions found in other portions of the body that may be segmented in accordance with the invention.

One advantage of the systems and methods disclosed herein is that it is not necessary that the segmentation algorithm be applied to a full volume of an organ or organ system. Volumes of a portion of an anatomical region or organ may be segmented by applying a subset of the processing steps described above in the application. Also, the segmentation routine can be applied to a partial volume constructed from image data. In this way, doctors can focus on a particular region of interest without applying the algorithm to the complete data set. Accordingly, the segmentation systems and methods provided support temporal and cross-patient comparisons and provide accurate results for diagnosis. Partial volume analysis reduces processing loads and, potentially, radiation dose to the patient.

Another advantage of the segmentation processes of the present invention is that they facilitate the reporting of the location of suspicious lesions. Where the segmentation is relatively fine, lesions can be located simply by describing them as located in a particular segmented region. Alternatively, lesions can be located with respect to various landmarks available in the digital images such as the heart, or the apex of the lung, or the inferior borders of the lung.

The algorithm described herein is operable on various data acquisition systems, such as CT, PET or SPECT scanning and imaging. The results of the segmentation algorithm can be passed for subsequent processing in the form of a mask volume. Segmentation results can be also displayed on a graphical user interface ("GUI") to provide comparison information for medical diagnosis and physiological evaluation. More details on the registration of temporal and cross-patient medical images can be found in "Automated Registration of 3-D Medical Scans of Similar Anatomical Structures," Ser. No. 09/993,790, which has been incorporated by reference above. The system and method can display various planar views and allows for highlighting ROIs and receiving user input regarding specific image data to be presented and selected. According to one system and method of the present invention, sets of 2-D and 3-D image sets are displayable on a GUI. Additionally, the GUI preferably allows for the selection and update of various planar and volumetric images by inputting commands (for example, by dragging/clicking a cursor in a particular display window) with no delay apparent to the user. Additionally, data volumes may be rotated, updated or selected with respect to fixed data. Accordingly, the algorithm disclosed herein provides segmentation systems and methods that support temporal and cross-patient comparisons and that provide accurate results for diagnosis displayable on a GUI or printed. More details on display of 2-D and 3-D images can be found in "Graphical User Interface for Display of Anatomical Information," Ser. No. 09/990,511, which has been incorporated by reference above.

The algorithm disclosed herein is a step-by-step description of a segmentation algorithm and is illustrated for thoracic image processing and the thoracic anatomy and nature of lung images. The same principles, however, may also be employed to segment other regions of the body such as the heart, brain, spine, colon, liver and kidney systems. The algorithm includes steps for thresholding, region growing, feature analysis, morphological closing and surface smoothness analysis. The present invention provides a system and method that is accurate, flexible and displays high levels of physiological detail over the prior art without specially configured equipment.

The foregoing examples illustrate certain exemplary embodiments of the invention from which other obvious embodiments, variations, and modifications will be apparent to those skilled in the art. The invention should therefore not be limited to the particular embodiments discussed above, but rather is defined by the claims.

What is claimed is:

1. A method of segmenting information to identify organ nodules in a series of digital images comprising:

forming from the digital images a series of reduced resolution images having a spatial resolution that is coarser than that of said digital images;

processing the reduced resolution images to identify a reduced resolution body region and a reduced resolution background region;

using the identification of the reduced resolution body region and the reduced resolution background region to identify a body region and a background region in the digital images;

processing an organ region in the digital images to identify a boundary of an organ; and processing the digital images to identify a region of interest in the organ.

2. The method of claim 1 wherein the organ boundary is a pleural boundary.

3. The method of claim 2 wherein the region of interest is a pleural nodule.

4. The method of claim 1 wherein processing the reduced resolution images to identify a body region and a background region comprises:

identifying in the reduced resolution images seed points at image voxels having gray level intensities exceeding a first predetermined threshold;

growing volumes from the seed points to include voxels having gray level intensities exceeding a second predetermined threshold;

identifying the body region as the largest volume grown; and growing the background region inwards from the periphery of the reduced resolution image to the volume identified as the body region.

5. The method of claim 4 further comprising growing remaining unidentified voxels and selecting a largest or first two largest volumes as a lung field.

* * * * *